United States Patent [19]

Fujiwara et al.

[11] 4,265,668
[45] May 5, 1981

[54] HIGH DIELECTRIC CONSTANT TYPE CERAMIC COMPOSITION

[75] Inventors: Shinobu Fujiwara, Nikahomachi; Kiyoshi Furukawa; Nobuaki Kikuchi, both of Akita; Osamu Iizawa, Honjo; Hitoshi Tanaka, Nikahomachi, all of Japan

[73] Assignee: TDK Electronics Co., Ltd., Tokyo, Japan

[21] Appl. No.: 89,245

[22] Filed: Oct. 29, 1979

[30] Foreign Application Priority Data

Oct. 30, 1978 [JP] Japan .................. 53/133518
Mar. 2, 1979 [JP] Japan .................. 54/24243
Mar. 7, 1979 [JP] Japan .................. 54/24246
Mar. 7, 1979 [JP] Japan .................. 54/26448

[51] Int. Cl.³ ............ C04B 35/46; C04B 35/00; H01B 3/12
[52] U.S. Cl. .................. 106/73.3; 106/39.5
[58] Field of Search .............. 106/73.3, 39.5; 252/63.2, 63.5

[56] References Cited

U.S. PATENT DOCUMENTS

| | | | |
|---|---|---|---|
| 3,472,777 | 10/1969 | Brixner | 106/73.3 |
| 3,775,531 | 11/1973 | Smith | 106/73.3 |
| 4,048,546 | 9/1977 | Bouchard et al. | 106/73.3 |
| 4,061,816 | 12/1977 | Kitamura | 106/73.3 |

Primary Examiner—O. R. Vertiz
Assistant Examiner—Mark Bell
Attorney, Agent, or Firm—Kenyon & Kenyon

[57] ABSTRACT

A basic ceramic composition of high dielectric constant type ceramic composition comprises from 68.67 to 69.19% of PbO, from 3.67 to 4.09% of MgO, from 24.17 to 26.99% of $Nb_2O_5$ and from 0.25 to 2.97% of $TiO_2$, all percentages being by weight. Modified composition may comprise additive of $Pb(Mn_{\frac{2}{3}}W_{\frac{1}{3}})O_3$, $Pb(Mn_{\frac{1}{3}}Nb_{\frac{2}{3}})O_3$, $Pb(Mn_{\frac{1}{3}}Ta_{\frac{2}{3}})O_3$, $Pb(Mn_{\frac{1}{2}}W_{\frac{1}{2}})O_3$, MnO, and MgO. Modified composition may comprise Ba, Sr and Ca, which replace Pb of the basic ceramic composition. In a modified composition, the content of B site elements may be larger than that of A site element of an $ABO_3$ crystal of the high dielectric constant type ceramic composition. A high dielectric constant, low dielectric loss, low temperature dependence of capacitance, high insulation resistance and a low sintering temperature are provided by the ceramic compositions of the present invention.

21 Claims, No Drawings

HIGH DIELECTRIC CONSTANT TYPE CERAMIC COMPOSITION

The present invention relates to a ceramic dielectric composition, which can be classified into a high dielectric constant type and a temperature-compensating type, and relates, more particularly, to the former type ceramic dielectric composition, which is characterized by being sintered at a relatively low temperature, exhibiting a high dielectric constant, a reduced dielectric loss, and a low dependence of the properties upon temperature. This ceramic dielectric composition is suitable for "high dielectric constant" capacitors of a compact-type with large capacity, such as laminar capacitors.

Most ceramic dielectrics heretofore proposed for high dielectric constant capacitors contain, as the basic ingredient, a compound having a perovskite structure, such as barium titanate ($BaTiO_3$), barium stannate ($BaSnO_3$) and calcium titanate ($CaTiO_3$). Depending upon various requirements in using the dielectrics in the capacitors, an additional element, which constitutes the substitutional solid solution of the basic ingredient, is used for increasing the dielectric constant of ceramic dielectrics. A compound having a structure different from the perovskite structure, can be mixed with the basic ingredient so as to increase the dielectric constant of the ceramic dielectrics. In the most widely used dielectrics, the dielectric constant thereof is increased as mentioned above. In such increase of the dielectric constant, the Curie point of the dielectrics can be adjusted to a value corresponding to that at room temperature, so as to increase the dielectric constant to the maximum value, for example from 4000 to 20,000, which can be achieved by a dielectric comprising a particular basic ingredient. The temperature dependence of the dielectric constant of such dielectric is, however, increased by the increase of the dielectric constant. On the other hand, when the temperature dependence of dielectric constant is decreased, the maximum value of dielectric constant is disadvantageously decreased.

Suitable sintering temperatures of the ceramic dielectric compositions mentioned above are generally 1200° to 1400° C. Accordingly, a large amount of heat energy is required for sintering. In addition, due to the high sintering temperature of from 1200° to 1400° C., the sintering furnace is considerably deteriorated and eroded during the sintering. As a result, the maintainance cost of the sintering furnace becomes, therefore, expensive.

Recently, a ceramic capacitor which is more compact and of more improved capacity, and possesses a high reliability, has been desired in the field, including the communication industry. Thus, a capacitor of a thin ceramic film having a 0.1 to 0.2 mm thickness and a ceramic laminar capacitor composed of a plurality of superimposed laminae, each having a thickness of approximately 50 microns or less, have been put to practical use. In the production of the laminar ceramic capacitor, the laminated dielectric body must be sintered, while the internal electrodes of the ceramic capacitor are inserted in the laminated body. Since the sintering temperature of the coventional ceramic dielectrics is high, a noble metal, such as platinum or palladium, or their alloys, had to be used as the internal electrodes.

It is proposed in German Offenlegungsschrift No. 27 01 411 that the sintering temperature of a high dielectric constant type ceramic composition be lowered to 1000° C. or less by preparing the composition from two components, i.e. $Pb(Fe_\frac{2}{3}W_\frac{1}{3})_xO_3$ and $Pb(Fe_\frac{1}{2}Nb_\frac{1}{2})_{1-x}O_3$. Since the laminated ceramic capacitor can be produced by a low sintering temperature of less than 1000° C., according to the proposal in the German Offenlegungsschrift cheap materials such as silver, nickel, aluminum, and the like, can be used as the internal electrodes of the cpacitor, and therefore, the production cost of the capacitor can advantageously be lowered from that of the prior art.

It is an object of the present invention to provide ceramic dielectric compositions which: can be sintered at a relatively low sintering temperature; have a high insulation resistance; have a relatively high dielectric constant in the high dielectric type ceramic dielectrics, have a low dielectric loss, and; have a low dependence of dielectric constant upon temperature.

It is another object of the present invention to provide ceramic dielectric compositions particularly suitable for a high dielectric constant type capacitor of a compact and laminar type.

In accordance with the objects of the present invention there is provided a high dielectric constant type, ceramic composition, hereinafter referred to as the basic ceramic composition, which comprises from 68.67 to 69.19% of PbO, from 3.67 to 4.09% of MgO, 24.17 to 26.99% of $Nb_2O_5$ and from 0.25 to 2.97% of $TiO_2$, all percentages being by weight based on the basic ceramic composition. The basic ceramic composition is mainly composed of a double oxide of $Pb(Mg_\frac{1}{3}Nb_\frac{2}{3})O_3$ and a double oxide of $PbTiO_3$. The proportions of $Pb(Mg_\frac{1}{3}Nb_\frac{2}{3})O_3$ and $TbTiO_3$ are from 88.0 to 99.0 molar% and from 1.0 to 12.0 molar%, respectively. The crystal structure of these double oxides can be generally expressed in an $A_xB_yO_3$ form, wherein each of the A and B components occupy predetermined positions of a crystal lattice, i.e. the perovskite lattice. The A component is lead (Pb), and the B component is magnesium (Mg), niobium (Nb) or titanium (Ti). The values of x and y are 1.00 in the basic ceramic composition.

Provided in accordance with the objects of the present invention are the following modified ceramic compositions.

A. A modified ceramic composition which comprises the basic ceramic composition and $Pb(Mn_\frac{2}{3}W_\frac{1}{3})O_3$ in an amount of from 0.05 to 5.0 parts by weight, based on 100 weight parts of the basic ceramic composition.

B. A modified ceramic composition which comprises the basic ceramic composition and $Pb(Mn_\frac{1}{3}Nb_\frac{2}{3})O_3$ in an amount of from 0.05 to 5.0 parts by weight, based on 100 weight parts of the basic ceramic composition.

C. A modified ceramic composition which comprises the basic ceramic composition and $Pb(Mn_\frac{1}{3}Ta_\frac{2}{3})O_3$ in an amount of from 0.05 to 5.0 parts by weight based on 100 weight parts of the basic ceramic composition.

D. A modified ceramic composition which comprises the basic ceramic composition and $Pb(Mn_\frac{1}{2}W_\frac{1}{2})O_3$ in an amount of from 0.05 to 5.0 parts by weight, based on 100 weight parts of the basic ceramic composition.

E. A modified ceramic composition which comprises the basic ceramic composition and MnO in an amount of from 0.001 to 1.5 parts by weight, based on 100 weight parts of the basic ceramic composition.

F. A modified composition which comprises an MgO oxide additive in addition to the double oxides mentioned above, i.e. $Pb(Mg_\frac{1}{3}Nb_\frac{2}{3})O_3$ and $PbTiO_3$, and in which the amount of the MgO oxide additive is not more than 25 parts by weight, based on 100 parts by weight of an MgO oxide contained in the double oxide of Pb(Mg$_\frac{1}{3}$Nb$_\frac{2}{3}$)O$_3$.

The additive of Pb(Mn$_\frac{1}{3}$Nb$_\frac{2}{3}$)O$_3$ in an amount of from 0.05 to 5.0 parts by weight may be added to 100 parts by weight of the double oxides.

G. A modified composition which comprises at least one additive element selected from the group consisting of barium (Ba), strontium (Sr) and calcium (Ca) in an amount of not more tha 10 atomic parts, based on 100 atomic parts of lead (Pb) contained in the double oxides, mentioned above, i.e. Pb(Mg$_\frac{1}{3}$Nb$_\frac{2}{3}$)O$_3$ and PbTiO$_3$.

H. A modified composition which comprises the A and B components mentioned above at a molar ratio of A/B of from 0.9200 to less than 1.0000.

I. A modified composition which comprises from 60 to 98 molar% of Pb(Mg$_\frac{1}{3}$Nb$_\frac{2}{3}$)O$_3$ and from 2 to 40 molar% of PbTiO$_3$, and further, from 0.2 to 8.0 parts by weight of at least one additive oxide selected from the group consisting of Bi$_2$O$_3$ and WO$_3$, based on 100 parts by weight of total weight of Pb(Mg$_\frac{1}{3}$Nb$_\frac{2}{3}$)O$_3$ and PbTiO$_3$.

The properties and the embodiments of the ceramic compositions according to the present invention will now be illustrated.

Every high dielectric constant type ceramic composition according to the present invention can be sintered at a relatively low temperature of 1130° C. or lower. In the basic ceramic composition, the contents of lead oxide (PbO), magnesium oxide (MgO), titanium oxide (TiO$_2$) and niobium oxide (Nb$_2$O$_5$) are determined based on the following. When the content lead oxide (PbO) is less than 68.67% and the content of magnesium oxide (MgO) is more than 4.09%, the dielectric constant is too low to use the ceramic dielectrics on a practical basis, and the sintering temperature is disadvantageously high. When the content of titanium oxide (TiO$_2$) is less than 0.25% and the content of niobium oxide (Nb$_2$O$_5$) is more than 26.99%, the dielectric constant is too low and the sintering temperature is high as mentioned above. When the content of lead oxide (PbO) is more than 69.19%, the content of magnesium oxide (MgO) is less than 3.67%, the content of niobium oxide (Nb$_2$O$_5$) is less than 24.17 % and the content of titanium oxide (TiO$_2$) is more than 2.97%, the dielectric constant is too low and the dielectric loss is too high to use the ceramic dielectrics on a practical basis.

In the basic ceramic composition which is capable of being sintered at a relatively low temperature according to the present invention, the relative dielectric constant ($\epsilon_s$), which is simply referred to as the dielectric constant in the present specification, may be from 14000 to 20000. In the basic ceramic composition, the insulation resistance is more than $1\times10^{10}(\omega)$. Furthermore, the dielectric loss (tan $\delta$ at 1 KHz) is from 0.2 to 4.8% and is, therefore, low. A preferable basic ceramic composition comprises from 68.67 to 68.95% of PbO, from 3.86 to 4.09% of MgO, from 25.46 to 26.99% of Nb$_2$O$_5$ and from 0.25 to 1.73% of TiO$_2$. The insulation resistance (IR) described in the present specification indicates the resistance of a ceramic composition having a thickness of approximately 0.5 mm. A direct current of 500 V is applied to this composition at 20° C. when measuring the insulation resistance. The temperature dependence of the dielectric constant ($\epsilon_s$) described in the present specification indicates:

$$\Delta\epsilon_s = \frac{\epsilon_s \text{ at } 85° \text{C.} - \epsilon_s \text{ at } 20° \text{C.}}{\epsilon_s \text{ at } 20° \text{C.}} \times 100(\%) \text{ or}$$

$$\Delta\epsilon_s = \frac{\epsilon_s \text{ at } -25° \text{C.} - \epsilon_s \text{ at } 20° \text{C.}}{\epsilon_s \text{ at } 20° \text{C.}} \times 100(\%)$$

The term "temperature variance" of the dielectric constant used in the present specification indicates the absolute value of $\Delta\epsilon_s$.

By adding a particular amount of the additives Pb(Mn$_\frac{2}{3}$W$_\frac{1}{3}$)O$_3$, Pb(Mn$_\frac{1}{3}$Nb$_\frac{2}{3}$)O$_3$, Pb(Mn$_\frac{1}{3}$Ta$_\frac{2}{3}$)O$_3$, Pb(Mn$_\frac{2}{3}$W$_\frac{1}{3}$)O$_3$, and MnO into the basic ceramic composition, several or all of the electrical properties of the modified ceramic compositions can be improved to levels more preferable than those of the basic ceramic composition.

The modified ceramic composition mentioned in item A, above, containing Pb(Mn$_\frac{2}{3}$W$_\frac{1}{3}$)O$_3$, and capable of being sintered at a relatively low temperature, may exhibit dielectric constant ($\epsilon_s$) of from approximately 14,000 to 22,000. The dielectric loss (tan $\delta$ at 1 KHz) is very low because of the Pb(Mn$_\frac{2}{3}$W$_\frac{1}{3}$)O$_3$ additive ranges from approximately 0.1 to 1.2%. The modified composition mentioned in item A, above, may have a low temperature variance of less tha 65% and an insulation resistance (IR) of from $7\times10^{10}$ to $3\times10^{12}\omega$. At a Pb(Mn$_\frac{2}{3}$W$_\frac{1}{3}$)O$_3$ content of less than 0.05 parts by weight, the insulation resistance (IR) and the dielectric loss (tan $\delta$) are not improved appreciably when compared with those of the basic ceramic composition. At a Pb(Mn$_\frac{2}{3}$W$_\frac{1}{3}$)O$_3$ content of more than 5.00 parts by weight, the dielectric constant is too low to use the modified ceramic composition on a practical basis. The additive content is preferably from 0.1 to 0.6 parts by weight.

The modified ceramic composition mentioned in item B, above, containing an additive of Pb(Mn$_\frac{1}{3}$Nb$_\frac{2}{3}$)O$_3$ capable of being sintered at a relatively low temperature, may exhibit a dielectric constant ($\epsilon_s$) of from approximately 13700 to 22900, a dielectric loss (tan $\delta$ at 1 KHz) of from 0.1 to 1.4%, and an insulation resistance (IR) of from $7\times10^{10}$ to $1\times10^{12}\Omega$. The additive of Pb(Mn$_\frac{1}{3}$Nb$_\frac{2}{3}$)O$_3$ improves the dielectric loss (tan $\delta$) and insulation resistance (IR) of the basic ceramic composition. At an additive content of less than 0.05 parts by weight, the insulation resistance (IR) and the dielectric loss (tan $\delta$) are not improved enough. At an additive content of more than 5.0 parts by weight, the dielectric constant ($\epsilon_s$) is too low to use the modified composition on a practical basis. The additive content is preferably from 0.1 to 1.0 part by weight.

The modified composition mentioned in item C, above, containing an additive of Pb(Mn$_\frac{1}{3}$Ta$_\frac{2}{3}$)O$_3$ and capable of being sintered at a relatively low temperature, may exhibit a dielectric constant ($\epsilon_s$) of from approximately 14,100 to 22,800, a dielectric loss (tan $\delta$ at 1 KHz) of from 0.1 to 1.5%, and an insulation resistance (R) of approximately to $2\times10^{12}\Omega$. The additive of Pb(Mn$_\frac{1}{3}$Ta$_\frac{2}{3}$)O$_3$ improves the dielectric loss (tan $\delta$) and insulation resistance (IR) of the basic ceramic composition. At an additive content of less than 0.05 parts by weight the dielectric loss (tan $\delta$) and insulation resistance (IR) are not improved appreciably when compared with those of the basic ceramic composition. At an additive content of more than 5.0 parts by weight, the dielectric constant ($\epsilon_s$) is too low to use the modified composition on a practical basis. The additive content is preferably from 0.5 to 3.0 parts by weight.

The modified composition mentioned in item D, above, containing an additive of $Pb(Mn_{\frac{1}{2}}W_{\frac{1}{2}})O_3$ and capable of being sintered at a relatively low temperature, may exhibit a dielectric constant ($\epsilon_s$) of from approximately 13700 to 22900, a dielectric loss (tan $\delta$ at 1 KHz) of from 0.1 to 1.5% and an insulation resistance (IR) of from approximately $6 \times 10^{10}$ to $2 \times 10^{12} \Omega$. The additive of $Pb(Mn_{\frac{1}{2}}W_{\frac{1}{2}})O_3$ improves the dielectric loss (tan $\delta$) and insulation resistance (IR) of the basic ceramic composition. At an additive content of less than 0.05 parts by weight the dielectric loss (tan $\delta$) and insulation resistance (IR) are not improved appreciably when compared with those of the basic ceramic composition. At an additive content of more than 5.0 parts by weight, the dielectric constant ($\epsilon_s$) is to low to use the modified composition on a practical basis. The additive content is preferably from 0.1 to 1.5 parts by weight.

The modified composition mentioned in item E, above, containing an additive of MnO and capable of being sintered at a relatively low temperature, may exhibit a dielectric constant ($\epsilon_s$) of from approximately 7000 to 21000, a dielectric loss (tan $\delta$ at 1 KHz) of from 0.1 to 1.5% and an insulation resistance (IR) of from $8 \times 10^{10}$ to $1 \times 10^{12} \Omega$. The additive of MnO improves the dielectric loss (tan $\delta$) and insulation resistance (IR) of the basic ceramic composition. At an additive content of less than 0.001 parts by weight of the dielectric loss (tan $\delta$) and insulation resistance (IR) are not improved enough. At an additive content of more than 5.0 parts by weight, the dielectric constant ($\epsilon_s$) is too low the use the modified composition on a practical basis. The additive content is preferably from 0.005 to 0.2 parts by weight.

The modified composition mentioned in item F, above, includes an Mg oxide additive in an amount of not more tha 25 weight parts, based on stoichiometrically calculated 100 parts by weight of MgO in the double oxide of $Pb(Mg_{\frac{1}{3}}Nb_{\frac{2}{3}})O_3$. This modified composition can be sintered at a relatively low temperature and may exhibit a dielectric constant ($\epsilon_s$) of from 19,800 to 30,100, which is remarkably increased over that of the basic ceramic composition due to the Mg oxide additive. In addition to the advantageously high dielectric constant ($\epsilon_s$), the dielectric loss (tan $\delta$ at 1 KHz) is also low and may be approximately from 0.3 to 2.8%. When the content of the Mg oxide additive is more than 25 parts by weight, the dielectric constant ($\epsilon_s$) cannot be improved appreciably when compared with those of the basic ceramic composition. The content of the Mg oxide additive is preferably from 3 to 9 parts by weight.

The modified composition mentioned in item G, above, contains an additive element(s) which replaces lead (Pb) occupying the A sites of the $A_xB_yO_3$ crystal. The modified composition can be sintered at a relatively low temperature of 1050° C. or less, and may exhibit a dielectric constant ($\epsilon_s$) of 19400 to 22500, a dielectric loss (tan $\epsilon$ at 1 KHz) of from 0.2 to 2.8% and an insulation resistance (IR) of from $3 \times 10^{10}$ to $5 \times 10^{11} \Omega$. The additive element improves the dielectric constant ($\epsilon_s$) and dielectric loss (tan $\delta$). If the replacing amount of the additive element is more than 10 atomic parts, the dielectric constant cannot be improved appreciably when compared with those of the basic ceramic composition. The content of additive element is preferably from 3 to 10 atomic parts.

The modified composition mentioned in item H, above, comprises the A and B components not in identical molar amounts but the B component in a molar amount larger than that of the A component. In other words, the content of the elements of the B sites exceeds that of the A sites. Due to the excessive addition of the B sites element the dielectric constant ($\epsilon_s$) is remarkably increased while the dielectric loss (tan $\delta$) is maintained at a satisfactorily low level. The modified composition mentioned above can be sintered at 1100° C. or lower, and may exhibit a dielectric constant ($\epsilon_s$) of from approximately 20,300 to 29,800, a dielectric loss (tan $\delta$ at 1 KHz) of from approximately 0.8 to 1.7% and an insulation resistance (IR) of from $7 \times 10^{10}$ to $6 \times 10^{11} \Omega$. When the molar ratio of A/B is less than 0.9200 the dielectric constant is not improved significantly. A preferable molar ratio of A/B is from 0.950 to 0.982.

The modified composition mentioned in item I, above, can include the double oxides in a range broader than in the basic ceramic composition, due to the additive oxide of $Bi_2O_3$ and or $WO_3$. The composition of from 60 to 98 molar% of $Pb(Mg_{\frac{1}{3}}Nb_{\frac{2}{3}})O_3$ and from 2 to 40 molar% of $PbTiO_3$ corresponds to a composition comprising from 68.72 to 70.55% of PbO, from 2.55 to 4.05% of MgO, from 16.80 to 26.73 of $Nb_2O_5$ and from 0.49 to 10.10% of $TiO_2$, all percentages being by weight. The additive oxide improves the dielectric constant ($\epsilon_s$), the dielectric loss (tan $\epsilon$) and temperature variance of the $Pb(Mg_{\frac{1}{3}}Nb_{\frac{2}{3}})O_3$ and $PbTiO_3$ based composition. The modified composition can be sintered at a temperature of from 850° to 1100° C., and may exhibit dielectric constant ($\epsilon_s$) of from 4,000 to 16,500, a dielectric loss (tan $\delta$ at 1 KHz) of from 1.3 to 2.8% and an insulation resistance (IR) of from $3 \times 10^{10}$ to $8 \times 10^{10} \Omega$.

At an additive oxide content of less than 0.2 parts by weight, the dielectric loss (tan $\delta$) is too low to use the modified composition on a practical basis. At an additive oxide content of more than 8.0 parts by weight, the dielectric loss (tan $\delta$) is considerably deteriorated and the temperature dependence of the capacitance is unstable, so that the modified composition cannot be used on a practical basis. The preferable contents of $Pb(Mg_{\frac{1}{3}}Nb_{\frac{2}{3}})O_3$ and $PbTiO_3$ are from 91 to 97 molar% and from 3 to 9 molar%, respectively. The preferable content of additive oxide is from 2 to 6 parts by weight.

The contents of the basic composition, or the additive composition, should be selected in accordance with the electrical properties to be specifically achieved. For example, when a high dielectric constant should be achieved, the preferable contents of the basic component: from 68.7 to 69.0% of PbO; from 3.85 to 4.05% of MgO; from 25.45 to 26.50% of $Nb_2O_5$, and; from 0.70 to 1.75% of $TiO_2$. In addition, the preferable contents of the additive, element and oxide are: from 0.05 to 0.6 parts by weight of the additive oxides, and; from 1 to 10 atomic parts of at least one of Ba, Sr and Ca. Particularly advantageous are the modified composition mentioned in item H, above, and the modified composition mentioned in item F, above, having the MgO additive content of from 3 to 10 parts by weight.

When a low temperature variance should be achieved, the preferable contents of the additives are: from 0.05 to 2.0 parts by weight of $Pb(Mn_{\frac{2}{3}}W_{\frac{1}{3}})O_3$, $Pb(Mn_{\frac{1}{3}}Nb_{\frac{2}{3}})O_3$, $Pb(Mn_{\frac{1}{3}}Ta_{\frac{2}{3}})O_3$ and $Pb(Mn_{\frac{1}{2}}W_{\frac{1}{2}})O_3$, and; from 0.001 to 0.3 parts by weight of Mno.

A high insulation resistance (IR) and low dielectric loss (tan $\delta$) can be obtained at an additive content of from 0.5 to 3.0 parts by weight of $Pb(Mn_{\frac{2}{3}}W_{\frac{1}{3}})O_3$, $Pb(Mn_{\frac{1}{3}}Nb_{\frac{2}{3}})O_3$, $Pb(Mn_{\frac{1}{3}}Ta_{\frac{2}{3}})O_3$ and $Pb(Mn_{\frac{1}{2}}W_{\frac{1}{2}})O_3$).

One of the properties which must be provided in any PbO containing ceramic is the property of preventing vaporization of the PbO during sintering. The manganese containing additives can effectively prevent the PbO vaporization and can thus contribute to the stabilization of the sintering process.

The ceramic dielectric compositions of the present invention may be prepared as follows. Finely divided particles or powders of respective metal oxides are blended with each other using a ball mill and shaped into a suitable form. After a binder is added to the powders, the powders are press-formed for example, into discs. The discs are sintered at a temperature of from 850° to 900° C. for a period of one to two hours, enclosed in a magnesia ceramic vessel. Each disc is plated with a silver, nickel or aluminum electrode. Instead of metal oxides, metal carbonates may be used.

The present invention will now be explained further in detail by way of examples.

EXAMPLE 1

The weights of lead oxide (PbO), magnesium oxide (MgO), niobium oxide ($Nb_2O_5$) and titanium oxide ($TiO_2$), all in the powdered form, were adjusted so that the oxides were contained in the ceramic composition in the proportions as shown in Table 1, below. These oxide mixtures, serving as the raw material of the ceramic composition, were blended under a moist condition in a bowl made of an organic resin, and thereafter, presintered at a temperature ranging from 700° to 850° C. over a period of two hours. Subsequently, chemical reactions occurred between the powders. The so-reacted sintered powders were crushed to particles having a diameter of a few microns and were blended again with each other so as to obtain a powdered mixture. A predetermined amount of binder of polyvinyl alcohol (PVA) was added into the powdered mixture, which was then shaped under a shaping pressure of approximately 3 tons/cm² into discs having a diameter of 16.5 mm and a thickness of 0.6 mm. The shaped discs were air-tightly sealed in a magnesia ceramic vessel so as to prevent the lead component from being evaporated from the discs during sintering. The final sintering was carried out over a period of two hours, and ceramic bodies were produced. Thereafter, a silver electrode was baked onto each side of the ceramic bodies. The ceramic bodies with the pair of electrodes were used as samples for measuring electrical properties, i.e., the dielectric constant ($\epsilon_s$ at 1 KHz at 20° C.) the dielectric loss (tan δ at 1 KHz at 20° C.) and the insulation resistance (IR). The temperature dependence of the dielectric constant ($\epsilon_s$ at 1 KHz) was measured with regard to several samples. The measurement results are shown in Table 1. The asterisked samples all of the tables below designate the control samples unless otherwise mentioned.

TABLE 1

| Sample No. | Basic Ingredients (mol %) | | Proportion of Basic Oxides (wt %) | | | | Electric Properties | | | | Sintering Temperature (°C.) |
|---|---|---|---|---|---|---|---|---|---|---|---|
| | $Pb(Mg_{\frac{1}{3}}Nb_{\frac{2}{3}})O_3$ | $PbTiO_3$ | PbO | MgO | $Nb_2O_5$ | $TiO_2$ | $\epsilon_s$ | tan δ(%) | Temperature Dependence (%) −25° C. | +85° C. | IR (Ω) |
| 1* | 100 | 0 | 68.63 | 4.13 | 27.24 | 0 | 9800 | 0.1 | +49 | −59.2 | $3 \times 10^{10}$ | 1150 |
| 2 | 99 | 1 | 68.67 | 4.09 | 26.99 | 0.25 | 14200 | 0.2 | +26.0 | −68.5 | $4 \times 10^{10}$ | 1130 |
| 3 | 97 | 3 | 68.76 | 4.02 | 26.48 | 0.74 | 20000 | 0.4 | −35.0 | −65.0 | $6 \times 10^{10}$ | 1100 |
| 4 | 95 | 5 | 68.86 | 3.94 | 25.97 | 1.23 | 21400 | 1.3 | −39.3 | −62.6 | $3 \times 10^{10}$ | 1100 |
| 5 | 93 | 7 | 68.95 | 3.86 | 25.46 | 1.73 | 20950 | 1.8 | −61.8 | −52.3 | $1 \times 10^{10}$ | 1100 |
| 6 | 91 | 9 | 69.05 | 3.78 | 24.94 | 2.23 | 18900 | 3.5 | −65.1 | −36.6 | $2 \times 10^{10}$ | 1100 |
| 7 | 88 | 12 | 69.19 | 3.67 | 24.17 | 2.97 | 16200 | 4.8 | −66.6 | +32.0 | $2 \times 10^{10}$ | 1100 |
| 8* | 85 | 15 | 69.34 | 3.55 | 23.39 | 3.72 | 9000 | 8.8 | −74.4 | +89.0 | $1 \times 10^{10}$ | 1100 |

EXAMPLE 2

The procedure of Example 1 was repeated, except that tungsten oxides ($WO_3$) was used as one of the starting ingredients. The measurement results are shown in Table 2. The asterisked samples in Table 2 fall within the composition range of the basic ceramic composition.

TABLE 2

| Sample No. | Basic Ingredients (mol %) | | Additive Parts by weight | Proportion of Basic Oxides (wt %) | | | |
|---|---|---|---|---|---|---|---|
| | $Pb(Mg_{\frac{1}{3}}Nb_{\frac{2}{3}})O_3$ | $PbTiO_3$ | $Pb(Mn_{\frac{2}{3}}W_{\frac{1}{3}})O_3$ | PbO | MgO | $Nb_2O_5$ | $TiO_2$ |
| 9* | 97 | 3 | 0 | 68.76 | 4.02 | 26.48 | 0.74 |
| 10 | 97 | 3 | 0.05 | 68.76 | 4.02 | 26.48 | 0.74 |
| 11 | 97 | 3 | 0.1 | 68.76 | 4.02 | 26.48 | 0.74 |
| 12 | 97 | 3 | 0.5 | 68.76 | 4.02 | 26.48 | 0.74 |
| 13 | 97 | 3 | 1.0 | 68.76 | 4.02 | 26.48 | 0.74 |
| 14 | 97 | 3 | 3.0 | 68.76 | 4.02 | 26.48 | 0.74 |
| 15 | 97 | 3 | 5.0 | 68.76 | 4.02 | 26.48 | 0.74 |
| 16* | 97 | 3 | 8.0 | 68.76 | 4.02 | 26.48 | 0.74 |
| 17* | 95 | 5 | 0 | 68.86 | 3.94 | 25.97 | 1.23 |
| 18 | 95 | 5 | 0.3 | 68.86 | 3.94 | 25.97 | 1.23 |
| 19 | 95 | 5 | 0.6 | 68.86 | 3.94 | 25.97 | 1.23 |
| 20 | 95 | 5 | 2.0 | 68.86 | 3.94 | 25.97 | 1.23 |
| 21* | 95 | 5 | 9.0 | 68.86 | 3.94 | 25.97 | 1.23 |
| 22* | 93 | 7 | 0 | 68.95 | 3.86 | 25.46 | 1.73 |
| 23 | 93 | 7 | 0.2 | 68.95 | 3.86 | 25.46 | 1.73 |
| 24 | 93 | 7 | 0.5 | 68.95 | 3.86 | 25.46 | 1.73 |
| 25 | 93 | 7 | 1.5 | 68.95 | 3.86 | 25.46 | 1.73 |
| 26* | 93 | 7 | 10.0 | 68.95 | 3.86 | 25.46 | 1.73 |

| Additive | Electric Properties Temperature | Sintering |

TABLE 2-continued

| Sample No. | Parts by Weight Pb(Mn₁/₂W₁/₂)O₃ | $\epsilon_s$ | tan δ(%) | Dependence −25° C. | +85° C. | IR (Ω) | Temperature (°C.) |
|---|---|---|---|---|---|---|---|
| 9* | 0 | 20000 | 0.4 | −35.0 | −65.0 | $6 \times 10^{10}$ | 1100 |
| 10 | 0.05 | 20900 | 0.5 | −34.8 | −64.5 | $4 \times 10^{11}$ | 1060 |
| 11 | 0.1 | 20630 | 0.2 | −34.9 | −63.9 | $1 \times 10^{12}$ | 1060 |
| 12 | 0.5 | 20000 | 0.1 | −33.1 | −64.0 | $9 \times 10^{11}$ | 1040 |
| 13 | 1.0 | 18970 | 0.1 | −33.0 | −62.8 | $8 \times 10^{11}$ | 1020 |
| 14 | 3.0 | 16200 | 0.1 | −31.8 | −59.0 | $6 \times 10^{11}$ | 1000 |
| 15 | 5.0 | 14000 | 0.1 | −30.0 | −58.5 | $4 \times 10^{11}$ | 990 |
| 16* | 8.0 | 6050 | 0.2 | −20.5 | −41.8 | $4 \times 10^{10}$ | 990 |
| 17* | 0 | 21400 | 1.3 | −39.3 | −62.6 | $3 \times 10^{10}$ | 1100 |
| 18 | 0.3 | 21900 | 1.2 | −38.1 | −61.3 | $2 \times 10^{11}$ | 1050 |
| 19 | 0.6 | 20800 | 0.9 | −37.5 | −62.5 | $3 \times 10^{12}$ | 1050 |
| 20 | 2.0 | 17200 | 0.5 | −34.8 | −60.8 | $9 \times 10^{11}$ | 1020 |
| 21* | 9.0 | 4970 | 0.4 | −18.1 | −21.7 | $3 \times 10^{10}$ | 990 |
| 22* | 0 | 20950 | 1.8 | −61.8 | −52.3 | $1 \times 10^{10}$ | 1100 |
| 23 | 0.2 | 20800 | 1.0 | −60.9 | −51.8 | $7 \times 10^{10}$ | 1020 |
| 24 | 0.5 | 19950 | 0.9 | −58.7 | −51.1 | $3 \times 10^{11}$ | 980 |
| 25 | 1.5 | 15400 | 0.5 | −48.5 | −41.7 | $9 \times 10^{11}$ | 980 |
| 26* | 10.0 | 5010 | 0.6 | −28.0 | −39.0 | $2 \times 10^{10}$ | 960 |

EXAMPLE 3

The procedure of Example 1 was repeated, except that manganese oxide (MnO) was used as one of the starting ingredients. The measurement results are shown in Table 3. The asterisked samples in Table 3 fall within the composition range of the basic ceramic composition.

EXAMPLE 4

The procedure of Example 1 was repeated, except that manganese oxide (MnO) and tantalum oxide (Ta₂O₅) were used as parts of the starting ingredients. The measurement results are shown in Table 4. The asterisked samples fall within the composition range of the basic ceramic composition.

TABLE 3

| Sample No. | Basic Ingredients (mol %) Pb(Mg₁/₃Nb₂/₃)O₃ | PbTiO₃ | Additive Parts by weight Pb(Mn₁/₂Nb₁/₂)O₃ | Proportion of Basic Oxides (wt %) PbO | MgO | Nb₂O₅ | TiO₂ | $\epsilon_s$ | tan δ(%) | Temperature Dependence −25° C. | +85° C. | IR (Ω) | Sintering Temperature (°C.) |
|---|---|---|---|---|---|---|---|---|---|---|---|---|---|
| 27* | 97 | 3 | 0 | 68.76 | 4.02 | 26.48 | 0.74 | 20000 | 0.4 | −35.0 | −65.0 | $6 \times 10^{10}$ | 1100 |
| 28 | 97 | 3 | 0.05 | 68.76 | 4.02 | 26.48 | 0.74 | 21200 | 0.3 | −34.1 | −64.7 | $8 \times 10^{10}$ | 1060 |
| 29 | 97 | 3 | 0.1 | 68.76 | 4.02 | 26.48 | 0.74 | 20900 | 0.3 | −34.8 | −62.7 | $2 \times 10^{11}$ | 1040 |
| 30 | 97 | 3 | 0.5 | 68.76 | 4.02 | 26.48 | 0.74 | 20300 | 0.2 | −32.9 | −63.9 | $5 \times 10^{11}$ | 1040 |
| 31 | 97 | 3 | 1.0 | 68.76 | 4.02 | 26.48 | 0.74 | 19200 | 0.1 | −32.9 | −62.7 | $8 \times 10^{11}$ | 1020 |
| 32 | 97 | 3 | 3.0 | 68.76 | 4.02 | 26.48 | 0.74 | 16300 | 0.1 | −31.7 | −58.8 | $7 \times 10^{11}$ | 1000 |
| 33 | 97 | 3 | 5.0 | 68.76 | 4.02 | 26.48 | 0.74 | 13700 | 0.1 | −30.1 | −57.7 | $7 \times 10^{10}$ | 990 |
| 34* | 97 | 3 | 8.0 | 68.76 | 4.02 | 26.48 | 0.74 | 6100 | 0.1 | −19.8 | −42.1 | $5 \times 10^{10}$ | 980 |
| 35* | 95 | 5 | 0 | 68.86 | 3.94 | 25.97 | 1.23 | 21400 | 1.3 | −39.3 | −62.6 | $3 \times 10^{10}$ | 1100 |
| 36 | 95 | 5 | 0.3 | 68.86 | 3.94 | 25.97 | 1.23 | 22900 | 0.8 | −35.8 | −60.8 | $5 \times 10^{11}$ | 1060 |
| 37 | 95 | 5 | 0.6 | 68.86 | 3.94 | 25.97 | 1.23 | 20800 | 0.6 | −37.7 | −62.5 | $1 \times 10^{12}$ | 1040 |
| 38 | 95 | 5 | 2.0 | 68.86 | 3.94 | 25.97 | 1.23 | 15700 | 0.4 | −33.9 | −61.1 | $8 \times 10^{11}$ | 1020 |
| 39* | 95 | 5 | 9.0 | 68.86 | 3.94 | 25.97 | 1.23 | 5700 | 0.3 | −17.7 | −21.8 | $5 \times 10^{10}$ | 1000 |
| 40* | 93 | 7 | 0 | 68.95 | 3.86 | 25.46 | 1.73 | 20950 | 1.8 | −61.8 | −52.3 | $1 \times 10^{10}$ | 1100 |
| 41 | 93 | 7 | 0.2 | 68.95 | 3.86 | 25.46 | 1.73 | 21000 | 1.4 | −60.0 | −52.1 | $7 \times 10^{10}$ | 1020 |
| 42 | 93 | 7 | 0.5 | 68.95 | 3.86 | 25.46 | 1.73 | 20000 | 1.0 | −57.8 | −50.8 | $6 \times 10^{11}$ | 980 |
| 43 | 93 | 7 | 1.5 | 68.95 | 3.86 | 25.46 | 1.73 | 16600 | 0.8 | −48.1 | −40.2 | $7 \times 10^{11}$ | 980 |
| 44* | 93 | 7 | 10.0 | 68.95 | 3.86 | 25.46 | 1.73 | 4700 | 0.7 | −28.8 | −38.9 | $2 \times 10^{10}$ | 980 |

TABLE 4

| Sample No. | Basic Ingredients (mol %) PB(Mg₁/₃Nb₂/₃)O₃ | PbTiO₃ | Additive Parts by weight Pb(Mn₁/₂Ta₁/₂)O₃ | Proportion of Basic Oxides (wt %) PbO | MgO | Nb₂O₅ | TiO₂ | $\epsilon_s$ | tan δ (%) | Temperature Dependence −25° C. | +85° C. | IR (Ω) | Sintering Temperature (°C.) |
|---|---|---|---|---|---|---|---|---|---|---|---|---|---|
| 45* | 97 | 3 | 0 | 68.76 | 4.02 | 26.48 | 0.74 | 20000 | 0.4 | −35.0 | −65.0 | $6 \times 10^{10}$ | 1100 |
| 46 | 97 | 3 | 0.05 | 68.76 | 4.02 | 26.48 | 0.74 | 21350 | 0.3 | −34.1 | −63.7 | $9 \times 10^{10}$ | 1080 |
| 47 | 97 | 3 | 0.1 | 68.76 | 4.02 | 26.48 | 0.74 | 20900 | 0.3 | −34.2 | −62.8 | $5 \times 10^{11}$ | 1060 |
| 48 | 97 | 3 | 0.5 | 68.76 | 4.02 | 26.48 | 0.74 | 20100 | 0.2 | −32.7 | −63.1 | $2 \times 10^{12}$ | 1060 |
| 49 | 97 | 3 | 1.0 | 68.76 | 4.02 | 26.48 | 0.74 | 18970 | 0.2 | −32.7 | −61.9 | $6 \times 10^{11}$ | 1040 |
| 50 | 97 | 3 | 3.0 | 68.76 | 4.02 | 26.48 | 0.74 | 16300 | 0.1 | −30.9 | −57.7 | $4 \times 10^{11}$ | 1020 |
| 51 | 97 | 3 | 3.0 | 68.76 | 4.02 | 26.48 | 0.74 | 14100 | 0.1 | −30.3 | −51.5 | $2 \times 10^{11}$ | 1000 |
| 52* | 97 | 3 | 8.0 | 68.76 | 4.02 | 26.48 | 0.74 | 5990 | 0.2 | −21.1 | −40.8 | $3 \times 10^{10}$ | 1000 |
| 53* | 95 | 5 | 0 | 68.86 | 3.94 | 25.97 | 1.23 | 21400 | 1.3 | −39.3 | −62.6 | $3 \times 10^{10}$ | 1100 |
| 54 | 95 | 5 | 0.3 | 68.86 | 3.94 | 25.97 | 1.23 | 22800 | 1.1 | −37.7 | −59.8 | $5 \times 10^{11}$ | 1080 |
| 55 | 95 | 5 | 0.6 | 68.86 | 3.94 | 25.97 | 1.23 | 20910 | 0.8 | −37.6 | −57.7 | $2 \times 10^{12}$ | 1060 |

TABLE 4-continued

| Sample No. | Basic Ingredients (mol %) PB(Mg$_{1/3}$Nb$_{2/3}$)O$_3$ | PbTiO$_3$ | Additive Parts by weight Pb(Mn$_{1/2}$Ta$_{2/3}$)O$_3$ | Proportion of Basic Oxides (wt %) PbO | MgO | Nb$_2$O$_5$ | TiO$_2$ | $\epsilon_s$ | tan δ (%) | Temperature Dependence −25° C. | +85° C. | IR (Ω) | Sintering Temperature (°C.) |
|---|---|---|---|---|---|---|---|---|---|---|---|---|---|
| 56 | 95 | 5 | 2.0 | 68.86 | 3.94 | 25.97 | 1.23 | 16000 | 0.6 | −33.9 | −54.8 | 8 × 10$^{11}$ | 1040 |
| 57* | 95 | 5 | 9.0 | 68.86 | 3.94 | 25.97 | 1.23 | 3100 | 0.4 | −19.9 | −51.9 | 7 × 10$^{10}$ | 1000 |
| 58* | 93 | 7 | 0 | 68.95 | 3.86 | 25.46 | 1.73 | 20950 | 1.8 | −61.8 | −52.3 | 1 × 10$^{10}$ | 1100 |
| 59 | 93 | 7 | 0.2 | 68.95 | 3.86 | 25.46 | 1.73 | 20200 | 1.5 | −59.8 | −50.9 | 9 × 10$^{10}$ | 1080 |
| 60 | 93 | 7 | 0.5 | 68.95 | 3.86 | 25.46 | 1.73 | 19900 | 1.0 | −57.8 | −50.1 | 7 × 10$^{11}$ | 1060 |
| 61 | 93 | 7 | 1.5 | 68.95 | 3.86 | 25.46 | 1.73 | 15100 | 0.7 | −44.4 | −48.8 | 8 × 10$^{11}$ | 1040 |
| 62* | 93 | 7 | 10.0 | 68.95 | 3.86 | 25.46 | 1.73 | 5200 | 0.8 | −24.5 | −39.7 | 6 × 10$^{10}$ | 1040 |

EXAMPLE 5

The procedure of Example 1 was repeated, except that tungsten oxide (WO$_3$) and manganese oxide (MnO) were used as parts of the starting ingredients. The measurement results are shown in Table 5. The asterisked samples fall within the composition range of the basic ceramic composition.

EXAMPLE 6

The procedure of Example 1 was repeated, except that manganese oxide (MnO) was used as one of the starting ingredients. The measurement results are shown in Table 6. The asterisked samples fall within the composition range of the basic ceramic composition.

TABLE 5

| Sample No. | Basic Ingredients (mol %) PB(Mg$_{1/3}$Nb$_{2/3}$)O$_3$ | PbTiO$_3$ | Additive Parts by weight Pb(Mn$_{1/2}$W$_{1/2}$)O$_3$ | Proportion of Basic Oxides (wt %) PbO | MgO | Nb$_2$O$_5$ | TiO$_2$ | $\epsilon_s$ | tan δ(%) | −25° C. | +85° C. | IR (Ω) | Sintering Temperature (°C.) |
|---|---|---|---|---|---|---|---|---|---|---|---|---|---|
| 63* | 97 | 3 | 0 | 68.76 | 4.02 | 26.48 | 0.74 | 20000 | 0.4 | −35.0 | −65.0 | 6 × 10$^{10}$ | 1100 |
| 64 | 97 | 3 | 0.05 | 68.76 | 4.02 | 26.48 | 0.74 | 20900 | 0.3 | −34.8 | −61.9 | 7 × 10$^{11}$ | 1060 |
| 65 | 97 | 3 | 0.1 | 68.76 | 4.02 | 26.48 | 0.74 | 20750 | 0.2 | −33.8 | −63.5 | 2 × 10$^{12}$ | 1060 |
| 66 | 97 | 3 | 0.5 | 68.76 | 4.02 | 26.48 | 0.74 | 20300 | 0.1 | −32.9 | −64.0 | 8 × 10$^{11}$ | 1040 |
| 67 | 97 | 3 | 1.0 | 68.76 | 4.02 | 26.48 | 0.74 | 19150 | 0.1 | −32.9 | −61.7 | 4 × 10$^{11}$ | 1020 |
| 68 | 97 | 3 | 3.0 | 68.76 | 4.02 | 26.48 | 0.74 | 16270 | 0.1 | −31.9 | −58.8 | 2 × 10$^{11}$ | 1000 |
| 69 | 97 | 3 | 5.0 | 68.76 | 4.02 | 26.48 | 0.74 | 13700 | 0.1 | −29.0 | −56.0 | 9 × 10$^{10}$ | 990 |
| 70* | 97 | 3 | 8.0 | 68.76 | 4.02 | 26.48 | 0.74 | 5970 | 0.2 | −18.9 | −38.8 | 2 × 10$^{10}$ | 990 |
| 71* | 95 | 5 | 0 | 68.86 | 3.94 | 25.97 | 1.23 | 21400 | 1.3 | −39.3 | −62.6 | 3 × 10$^{10}$ | 1100 |
| 72 | 95 | 5 | 0.3 | 68.86 | 3.94 | 25.97 | 1.23 | 22900 | 0.9 | −36.6 | −59.8 | 4 × 10$^{11}$ | 1050 |
| 73 | 95 | 5 | 0.6 | 68.86 | 3.94 | 25.97 | 1.23 | 20150 | 0.7 | −35.4 | −59.7 | 2 × 10$^{12}$ | 1050 |
| 74 | 95 | 5 | 2.0 | 68.86 | 3.94 | 25.97 | 1.23 | 16000 | 0.4 | −27.8 | −54.5 | 9 × 10$^{11}$ | 1020 |
| 75* | 95 | 5 | 9.0 | 68.86 | 3.94 | 25.97 | 1.23 | 5500 | 0.2 | −18.9 | −23.7 | 6 × 10$^{10}$ | 990 |
| 76* | 93 | 7 | 0 | 68.95 | 3.86 | 25.46 | 1.73 | 20950 | 1.8 | −61.8 | −52.3 | 1 × 10$^{10}$ | 1100 |
| 77 | 93 | 7 | 0.2 | 68.95 | 3.86 | 25.46 | 1.73 | 20900 | 1.5 | −58.5 | −50.8 | 6 × 10$^{10}$ | 1020 |
| 78 | 93 | 7 | 0.5 | 68.95 | 3.86 | 25.46 | 1.73 | 20000 | 1.1 | −54.7 | −50.5 | 8 × 10$^{11}$ | 980 |
| 79 | 93 | 7 | 1.5 | 68.95 | 3.86 | 25.46 | 1.73 | 16200 | 0.6 | −46.6 | −40.8 | 6 × 10$^{11}$ | 980 |
| 80* | 93 | 7 | 10.0 | 68.95 | 3.86 | 25.46 | 1.73 | 4950 | 0.7 | −21.5 | −40.0 | 3 × 10$^{10}$ | 960 |

TABLE 6

| Sample No. | Basic Ingredients (mol %) Pb(Mg$_{1/3}$Nb$_{2/3}$)O$_3$ | PbTiO$_3$ | Additive Parts by weight MnO | Proportion of Basic Oxides (wt %) PbO | MgO | Nb$_2$O$_5$ | TiO$_2$ | Additive Parts by weight MnO | $\epsilon_s$ | tan δ(%) | −25° C. | +85° C. | IR (Ω) | Sintering Temperature (°C.) |
|---|---|---|---|---|---|---|---|---|---|---|---|---|---|---|
| 81* | 97 | 3 | 0 | 68.76 | 4.02 | 26.48 | 0.74 | 0 | 20000 | 0.4 | −35.0 | −65.0 | 6 × 10$^{10}$ | 1100 |
| 82 | 97 | 3 | 0.005 | 68.76 | 4.02 | 26.40 | 0.74 | 0.005 | 20850 | 0.3 | −36.1 | −64.8 | 8 × 10$^{10}$ | 1100 |
| 83 | 97 | 3 | 0.01 | 68.76 | 4.02 | 26.48 | 0.74 | 0.01 | 20150 | 0.3 | −34.8 | −65.1 | 3 × 10$^{11}$ | 1080 |
| 84 | 97 | 3 | 0.2 | 68.76 | 4.02 | 26.48 | 0.74 | 0.2 | 17200 | 0.2 | −28.8 | −58.9 | 8 × 10$^{11}$ | 1060 |
| 85 | 97 | 3 | 0.5 | 68.76 | 4.02 | 26.48 | 0.74 | 0.5 | 12200 | 0.1 | −21.8 | −33.0 | 5 × 10$^{11}$ | 1040 |
| 86 | 97 | 3 | 1.0 | 68.76 | 4.02 | 26.48 | 0.74 | 1.0 | 9870 | 0.1 | −14.5 | −27.1 | 9 × 10$^{11}$ | 1040 |
| 87 | 97 | 3 | 1.3 | 68.76 | 4.02 | 26.48 | 0.74 | 1.3 | 7850 | 0.1 | −16.6 | −24.2 | 7 × 10$^{11}$ | 1020 |
| 88* | 97 | 3 | 2.0 | 68.76 | 4.02 | 26.48 | 0.74 | 2.0 | 4220 | 0.1 | −18.8 | −20.0 | 6 × 10$^{10}$ | 1020 |
| 89* | 95 | 5 | 0 | 68.86 | 3.94 | 25.97 | 1.23 | 0 | 21400 | 1.3 | −39.3 | −62.6 | 3 × 10$^{10}$ | 1100 |
| 90 | 95 | 5 | 0.02 | 68.86 | 3.94 | 25.97 | 1.23 | 0.02 | 20780 | 1.1 | −41.1 | −58.8 | 8 × 10$^{11}$ | 1100 |
| 91 | 95 | 5 | 0.3 | 68.86 | 3.94 | 25.97 | 1.23 | 0.3 | 16650 | 0.8 | −36.6 | −57.5 | 9 × 10$^{11}$ | 1080 |
| 92 | 95 | 5 | 1.5 | 68.86 | 3.94 | 25.97 | 1.23 | 1.5 | 7020 | 0.5 | −24.2 | −30.8 | 7 × 10$^{11}$ | 1040 |
| 93* | 95 | 5 | 3.0 | 68.86 | 3.94 | 25.97 | 1.23 | 3.0 | 3950 | 0.4 | −19.5 | −22.0 | 5 × 10$^{10}$ | 1020 |
| 94 | 93 | 7 | 0 | 68.95 | 3.86 | 25.46 | 1.73 | 0 | 20950 | 1.8 | −61.8 | −52.3 | 1 × 10$^{10}$ | 1100 |
| 95 | 93 | 7 | 0.001 | 68.95 | 3.86 | 25.46 | 1.73 | 0.001 | 21000 | 1.5 | −60.5 | −53.8 | 6 × 10$^{11}$ | 1100 |
| 96 | 93 | 7 | 0.03 | 68.95 | 3.86 | 25.46 | 1.73 | 0.03 | 20990 | 1.1 | −58.8 | −52.1 | 1 × 10$^{12}$ | 1080 |
| 97 | 93 | 7 | 0.3 | 68.95 | 3.86 | 25.46 | 1.73 | 0.3 | 15200 | 0.8 | −48.9 | −42.0 | 8 × 10$^{11}$ | 1060 |
| 98 | 93 | 7 | 1.0 | 68.95 | 3.86 | 25.46 | 1.73 | 1.3 | 10880 | 0.7 | −32.9 | −41.5 | 5 × 10$^{11}$ | 1040 |

TABLE 6-continued

| Sample No. | Basic Ingredients (mol %) | | Additive Parts by weight MnO | Proportion of Basic Oxides (wt %) | | | | Additive Parts by weight MnO | Electric Properties | | Temperature Dependence (%) | | | Sintering Temperature (°C.) |
|---|---|---|---|---|---|---|---|---|---|---|---|---|---|---|
| | Pb(Mg⅓Nb⅔)O₃ | PbTiO₃ | | PbO | MgO | Nb₂O₅ | TiO₂ | | $\epsilon_s$ | tan δ(%) | −25° C. | +85° C. | IR (Ω) | |
| 99* | 93 | 7 | 3.0 | 68.95 | 3.86 | 25.46 | 1.73 | 3.0 | 4020 | 0.8 | −18.5 | −20.5 | 3 × 10¹⁰ | 1020 |

EXAMPLE 7

The procedure of Example 1 was repeated so as to produce the ceramic compositions as shown in Table 7. The measurement results are shown in Table 7. The asterisked samples Nos. 102 and 110 fall within the composition range of the basic ceramic composition.

TABLE 7

| Sample No. | Basic Ingredients (mol %) | | Excess MgO Wt. Part | Proportion of Basic Oxides (wt %) | | | | Excess MgO (wt %) | Electric Properties | | Temperature Dependence (%) | | | Sintering Temperature (°C.) |
|---|---|---|---|---|---|---|---|---|---|---|---|---|---|---|
| | PB(Mg⅓Nb⅔)O₃ | PbTiO₃ | | PbO | MgO | Nb₂O₅ | TiO₂ | | $\epsilon_s$ | tan δ(%) | −25° C. | +85° C. | IR (Ω) | |
| 100* | 99 | 1 | 0 | 63.67 | 4.09 | 26.99 | 0.25 | 0 | 14200 | 0.2 | +26.0 | −68.5 | 4 × 10¹⁰ | 1150 |
| 101 | 99 | 1 | 10 | 68.67 | 4.09 | 26.99 | 0.25 | 0.409 | 19800 | 0.3 | +28.5 | −66.0 | 8 × 10¹¹ | 1100 |
| 102* | 95 | 5 | 0 | 68.86 | 3.94 | 25.97 | 1.23 | 0 | 21400 | 1.3 | −39.3 | −62.6 | 3 × 10¹⁰ | 1100 |
| 103 | 95 | 5 | 3 | 68.86 | 3.94 | 25.97 | 1.23 | 0.118 | 22500 | 1.2 | −42.1 | −58.7 | 8 × 10¹⁰ | 1050 |
| 104 | 95 | 5 | 6 | 68.86 | 3.94 | 25.97 | 1.23 | 0.236 | 24700 | 1.4 | −47.4 | −63.1 | 2 × 10¹² | 1050 |
| 105 | 95 | 5 | 9 | 68.86 | 3.94 | 25.97 | 1.23 | 0.353 | 30100 | 1.3 | −40.8 | −60.5 | 1 × 10¹² | 1050 |
| 106 | 95 | 5 | 15 | 68.86 | 3.94 | 25.97 | 1.23 | 0.591 | 26200 | 1.4 | −41.3 | −59.0 | 3 × 10¹² | 1050 |
| 107 | 95 | 5 | 20 | 68.86 | 3.94 | 25.97 | 1.23 | 0.788 | 23800 | 1.4 | −39.5 | −62.0 | 7 × 10¹¹ | 1050 |
| 108 | 95 | 5 | 25 | 68.86 | 3.94 | 25.97 | 1.23 | 0.985 | 21900 | 1.6 | −40.2 | −61.8 | 3 × 10¹¹ | 1050 |
| 109* | 95 | 5 | 30 | 68.86 | 3.94 | 25.97 | 1.23 | 1.182 | 17700 | 1.5 | −40.8 | −58.8 | 6 × 10¹⁰ | 1080 |
| 110* | 91 | 9 | 0 | 69.05 | 3.78 | 24.94 | 2.23 | 0 | 18900 | 3.5 | −65.1 | −36.6 | 2 × 10¹⁰ | 1100 |
| 111 | 91 | 9 | 10 | 69.05 | 3.78 | 24.94 | 2.23 | 0.378 | 26800 | 2.8 | −62.0 | −37.7 | 9 × 10¹¹ | 1050 |
| 112* | 91 | 9 | 30 | 69.05 | 3.78 | 24.94 | 2.23 | 1.134 | 15100 | 2.6 | −61.1 | −40.5 | 3 × 10¹⁰ | 1100 |
| 113* | 85 | 15 | 0 | 69.34 | 3.55 | 23.39 | 3.72 | 0 | 9000 | 8.8 | −74.4 | +85 | 1 × 10¹⁰ | 1100 |
| 114* | 85 | 15 | 10 | 69.34 | 3.55 | 23.39 | 3.72 | 0.355 | 9880 | 9.3 | −75.2 | +86.6 | 2 × 10¹⁰ | 1050 |

EXAMPLE 8

The procedure of Example 1 was repeated, except that barium carbonates (BaCO₃), strontium carbonate (SrCO₃) and calcium carbonate (CaCO₃) were used as parts of the starting ingredients. The measurement results are shown in Table 8. The asterisked samples Nos. 115, 119 and 126 fall within the composition range of the basic ceramic composition.

TABLE 8

| Sample No. | Basic Ingredients (mol %) | | Replacing Element | Replacing Amount (wt %) | Proportion of Basic Oxides (wt %) | | | | Electric Properties | | Temperature Dependence (%) | | | Sintering Temperature (°C.) |
|---|---|---|---|---|---|---|---|---|---|---|---|---|---|---|
| | Pb(Mg⅓Mb⅔)O₃ | PbTiO₃ | | | PbO | MgO | Nb₂O₅ | TiO₂ | $\epsilon_s$ | tan δ (%) | −25° C. | +85° C. | IR (Ω) | |
| 115* | 97 | 3 | none | 0 | 68.76 | 4.02 | 26.48 | 0.74 | 20000 | 0.4 | −35.0 | −65.0 | 6 × 10¹⁰ | 1100 |
| 116 | 97 | 3 | Ba | 3 | 65.76 | 4.02 | 26.48 | 0.74 | 21100 | 0.3 | −34.8 | −64.2 | 7 × 10¹⁰ | 1080 |
| 117 | 97 | 3 | Ba | 5 | 63.76 | 4.02 | 26.48 | 0.74 | 21800 | 0.3 | −36.0 | −66.1 | 2 × 10¹¹ | 1060 |
| 118 | 97 | 3 | Ba | 10 | 58.76 | 4.02 | 26.48 | 0.74 | 20750 | 0.2 | −32.7 | −63.5 | 8 × 10¹⁰ | 1020 |
| 119* | 95 | 5 | none | 0 | 68.86 | 3.94 | 25.97 | 1.23 | 21400 | 1.3 | −39.3 | −62.6 | 3 × 10¹⁰ | 1100 |
| 120 | 95 | 5 | Ba | 1 | 67.86 | 3.94 | 25.97 | 1.23 | 21600 | 1.1 | −40.5 | −61.8 | 3 × 10¹⁰ | 1100 |
| 121 | 95 | 5 | Ba | 5 | 63.86 | 3.94 | 25.97 | 1.23 | 23300 | 0.8 | −41.3 | −59.8 | 6 × 10¹⁰ | 1100 |
| 122 | 95 | 5 | Sr | 1 | 67.86 | 3.94 | 25.97 | 1.23 | 22500 | 1.2 | −38.8 | −64.4 | 8 × 10¹⁰ | 1100 |
| 123 | 95 | 5 | Sr | 10 | 58.76 | 3.94 | 25.97 | 1.23 | 24700 | 0.7 | −42.4 | −60 | 2 × 10¹¹ | 1100 |
| 124 | 95 | 5 | Sr | 15 | 53.86 | 3.94 | 25.97 | 1.23 | 19400 | 0.7 | −41.8 | −59.8 | 5 × 10¹¹ | 1100 |
| 125 | 95 | 5 | Sr Ba Ca | 2 2 1 | 63.86 | 3.94 | 25.97 | 1.23 | 22500 | 1.0 | −42.0 | −60.8 | 4 × 10¹¹ | 1060 |
| 126* | 91 | 9 | none | 0 | 69.05 | 3.78 | 24.94 | 2.23 | 18900 | 3.5 | −65.1 | −36.6 | 2 × 10¹⁰ | 1100 |
| 127 | 91 | 9 | Ca | 2 | 67.05 | 3.78 | 24.94 | 2.23 | 19400 | 2.8 | −62.8 | −40.3 | 4 × 10¹⁰ | 1100 |
| 128 | 91 | 9 | Ba | 10 | 59.05 | 3.78 | 24.94 | 2.23 | 20800 | 2.9 | −66.6 | −35.8 | 6 × 10¹⁰ | 1080 |
| 129* | 91 | 9 | Ba | 15 | 54.05 | 3.78 | 24.94 | 2.23 | 16300 | 3.0 | −67.5 | −41.7 | 1 × 10¹⁰ | 1080 |
| 130 | 91 | 9 | Sr | 4 | 65.05 | 3.78 | 24.94 | 2.23 | 2.200 | 2.7 | −64.4 | −32.4 | 7 × 10¹⁰ | 1100 |

EXAMPLE 9

The procedure of Example 1 was repeated so as to produce the ceramic compositions as shown in Table 9. The measurement results are shown in Table 9. The asterisked samples Nos. 131 and 145 fall within the composition range of the basic ceramic composition.

TABLE 9

| Sample No. | Basic Ingredients (mol %) Pb(Mg⅓Nb⅔)O₃ | PbTiO₃ | Excess Additive of B site | Amount of Additive (wt %) | Ratio of A/B sites | Electric Properties $\epsilon_s$ | tan δ(%) | Temperature Dependence(%) −25°C. | +85°C. | IR (Ω) | Sintering Temperature (°C.) |
|---|---|---|---|---|---|---|---|---|---|---|---|
| 131* | 94 | 6 | none | 0 | 1.0000 | 20800 | 1.0 | −36.4 | −63.1 | 6 × 10¹⁰ | 1100 |
| 132 | 94 | 6 | MgO | 0.23 | 0.9819 | 24500 | 1.4 | −46.6 | −64.8 | 8 × 10¹⁰ | 1050 |
| 133 | 94 | 6 | " | 0.35 | 0.9727 | 29800 | 1.2 | −42.1 | −65.8 | 2 × 10¹¹ | 1050 |
| 134 | 94 | 6 | " | 0.59 | 0.9548 | 27800 | 1.3 | −40 | −63.7 | 4 × 10¹¹ | 1050 |
| 135 | 94 | 6 | " | 1.01 | 0.9247 | 22200 | 1.4 | −38.9 | −66.1 | 2 × 10¹¹ | 1050 |
| 136* | 94 | 6 | " | 1.29 | 0.9064 | 17100 | 1.6 | −40.1 | −66.2 | 4 × 10¹⁰ | 1100 |
| 137 | 94 | 6 | Nb₂O₅ | 0.77 | 0.9817 | 21900 | 1.2 | −38.7 | −63.5 | 7 × 10¹⁰ | 1100 |
| 138 | 94 | 6 | " | 1.29 | 0.9700 | 26800 | 1.2 | −42.3 | −65.0 | 1 × 10¹¹ | 1100 |
| 139 | 94 | 6 | " | 2.57 | 0.9411 | 24400 | 1.3 | −41.0 | −62.7 | 1 × 10¹¹ | 1100 |
| 140* | 94 | 6 | " | 3.86 | 0.9120 | 16200 | 1.5 | −40.8 | −59.7 | 3 × 10¹⁰ | 1150 |
| 141 | 94 | 6 | TiO₂ | 0.13 | 0.9949 | 23900 | 1.6 | −42.7 | −61.2 | 8 × 10¹⁰ | 1050 |
| 142 | 94 | 6 | " | 0.44 | 0.9824 | 26200 | 1.7 | −43.3 | −65.5 | 9 × 10¹⁰ | 1050 |
| 143 | 94 | 6 | " | 1.18 | 0.9548 | 24400 | 1.5 | −46.5 | −64.5 | 1 × 10¹¹ | 1050 |
| 144 | 94 | 6 | " | 1.63 | 0.9382 | 22100 | 1.4 | −39.0 | −62.7 | 2 × 10¹¹ | 1050 |
| 145 | 96 | 4 | none | 0 | 1.0000 | 20300 | 0.8 | −32.1 | −62.7 | 5 × 10¹⁰ | 1100 |
| 146 | 96 | 4 | TiO₂ | 0.75 | 0.9700 | 27700 | 1.3 | −39.0 | −66.1 | 2 × 10¹¹ | 1050 |
| 147 | 96 | 4 | TiO₂ 0.35 / MgO 0.20 | | 0.9705 | 29100 | 1.4 | −42.1 | −66.0 | 6 × 10¹¹ | 1050 |

EXAMPLE 10

The procedure of Example 1 was repeated, except that tungsten oxide (WO₃) and bismuth oxide (Bi₂O₃) were used as parts of the starting ingredients. The measurement results are shown in Table 10. The asterisked sample No. 151 falls within the composition range of the basic ceramic composition.

TABLE 10

| Sample No. | Basic Ingredients (%) Pb(Mg⅓Nb⅔)O₃ | PbTiO₃ | Additive (wt %) Bi₂O₃ | WO₃ | Proportion of Basic Oxides (wt. %) PbO | MgO | Nb₂O₅ | TiO₂ | $\epsilon_s$ | tanδ (%) | Temp. Dep. −25°C | +85°C | IR (Ω) | Sintering Temp (°C.) |
|---|---|---|---|---|---|---|---|---|---|---|---|---|---|---|
| 148* | 100 | 0 | 0 | 0 | 68.63 | 4.13 | 27.24 | 0 | 9800 | 0.1 | +49 | −55.2 | 3 × 10¹⁰ | 1150 |
| 149* | 100 | 0 | 6 | 0 | 68.63 | 4.13 | 27.24 | 0 | 1200 | 0.2 | +66 | −42.0 | 8 × 10⁹ | 1100 |
| 150* | 100 | 0 | 0 | 6 | 68.63 | 4.13 | 27.24 | 0 | 1350 | 0.3 | +69 | −45 | 9 × 10⁹ | 1100 |
| 151* | 91 | 9 | 0 | 0 | 69.05 | 3.78 | 24.94 | 2.23 | 18900 | 3.5 | −65.1 | −36.6 | 2 × 10¹⁰ | 1100 |
| 152 | 91 | 9 | 0.3 | 0 | 69.05 | 3.78 | 24.94 | 2.23 | 16000 | 1.3 | −45 | −29.0 | 7 × 10¹⁰ | 1050 |
| 153 | 91 | 9 | 0 | 0.3 | 69.05 | 3.78 | 24.94 | 2.23 | 16500 | 1.4 | −45 | −30 | 8 × 10¹⁰ | 1050 |
| 154* | 83 | 17 | 0 | 0 | 69.43 | 3.47 | 22.87 | 4.23 | 4500 | 6.0 | −48 | +120 | 3 × 10¹⁰ | 1100 |
| 155 | 83 | 17 | 0.3 | 0 | 69.43 | 3.47 | 22.87 | 4.23 | 5500 | 2.8 | −39 | +150 | 4 × 10¹⁰ | 1050 |
| 156 | 83 | 17 | 2 | 0 | 69.43 | 3.47 | 22.87 | 4.23 | 10000 | 2.5 | −35 | +100 | 6 × 10¹⁰ | 1050 |
| 157 | 83 | 17 | 4 | 0 | 69.43 | 3.47 | 22.87 | 4.23 | 13000 | 2.0 | −40 | −24 | 5 × 10¹⁰ | 1000 |
| 158 | 83 | 17 | 6 | 0 | 69.43 | 3.47 | 22.87 | 4.23 | 6000 | 1.5 | −30 | −13 | 4 × 10¹⁰ | 1000 |
| 159 | 83 | 17 | 8 | 0 | 69.43 | 3.47 | 22.87 | 4.23 | 4000 | 1.6 | +2 | −17 | 3 × 10¹⁰ | 950 |
| 160* | 83 | 17 | 10 | 0 | 69.43 | 3.47 | 22.87 | 4.23 | 2500 | 3.2 | +14 | −25 | 1 × 10¹⁰ | 950 |
| 161 | 83 | 17 | 0 | 0.3 | 69.43 | 3.47 | 22.87 | 4.23 | 6000 | 2.9 | −40 | +140 | 3 × 10¹⁰ | 1050 |
| 162 | 83 | 17 | 0 | 2 | 69.43 | 3.47 | 22.87 | 4.23 | 11000 | 2.4 | −36 | +110 | 5 × 10¹⁰ | 1050 |
| 163 | 83 | 17 | 0 | 5 | 69.43 | 3.47 | 22.87 | 4.23 | 9700 | 1.8 | −40 | −26 | 7 × 10¹⁰ | 1000 |
| 164 | 83 | 17 | 0 | 8 | 69.43 | 3.47 | 22.87 | 4.23 | 4600 | 1.6 | −2 | −15 | 4 × 10¹⁰ | 950 |
| 165* | 83 | 17 | 0 | 10 | 69.43 | 3.47 | 22.87 | 4.23 | 2700 | 4.2 | +17 | −27 | 8 × 10⁹ | 950 |
| 166 | 83 | 17 | 1.5 | 1.5 | 69.43 | 3.47 | 22.87 | 4.23 | 11000 | 1.8 | −35 | −23 | 8 × 10¹⁰ | 1000 |
| 167 | 83 | 17 | 3 | 3 | 69.43 | 3.47 | 22.87 | 4.23 | 6500 | 1.6 | −28 | −15 | 5 × 10¹⁰ | 970 |
| 168 | 83 | 17 | 3 | 1 | 69.43 | 3.47 | 22.87 | 4.23 | 12500 | 1.8 | −37 | −25 | 4 × 10¹⁰ | 970 |

EXAMPLE 11

The procedure of Example 10 was repeated except that an additive of Pb(Mn⅓Nb⅔)O₃ was added to the sample No. 105. The measurement results are shown in Table 11.

TABLE 11

| Sample No. | Basic Ingredients (mol %) Pb(Mg⅓Nb⅔)O₃ | PbTiO₃ | Excess MgO wt. part | Additive (wt %) Pb(Mn⅓Nb⅔)O₃ | Proportion of Basic Oxides (wt %) PbO | MgO | Nb₂O₅ | TiO₂ |
|---|---|---|---|---|---|---|---|---|
| 169 | 95 | 5 | 9 | 0.2 | 68.86 | 3.94 | 25.97 | 1.23 |
| 170 | 95 | 5 | 9 | 0.5 | 68.86 | 3.94 | 25.97 | 1.23 |

| Sample | Excess MgO | Electric Properties Temperature Dependence (%) | Sintering Temperature |
|---|---|---|---|

TABLE 11-continued

| No. | (wt %) | $\epsilon_s$ | tan δ (%) | −25° C. | +85° C. | IR (Ω) | (°C.) |
| --- | --- | --- | --- | --- | --- | --- | --- |
| 169 | 0.353 | 30000 | 1.1 | −40.5 | −59.5 | $8 \times 10^{11}$ | 1040 |
| 170 | 0.353 | 30100 | 0.9 | −40.8 | −60.1 | $9 \times 10^{11}$ | 1040 |

What we claim is:

1. A high dielectric constant type ceramic composition, characterized in that said composition consists essentially of a basic ceramic composition of from 68.67 to 69.19% of PbO, from 3.67 to 4.09% of MgO, 24.17 to 26.99% of $Nb_2O_5$ and from 0.25 to 2.97% of $TiO_2$, all percentages being by weight.

2. A high dielectric constant type ceramic composition according to claim 1, characterized in that said composition comprises from 68.7 to 69.0% of PbO; from 3.85 to 4.05% of MgO; from 25.45 to 26.50% of $Nb_2O_5$, and; from 0.70 to 1.75% of $TiO_2$.

3. A high dielectric constant type ceramic composition according to claim 1, characterized in that said composition comprises said basic ceramic composition and $Pb(Mn_{\frac{2}{3}}W_{\frac{1}{3}})O_3$ in an amount of from 0.05 to 5.0 parts by weight, based on 100 weight parts of the basic ceramic composition.

4. A high dielectric constant type ceramic composition according to claim 3, characterized in that the amount of said $Pb(Mn_{\frac{2}{3}}W_{\frac{1}{3}})O_3$ is from 0.1 to 0.6 parts by weight.

5. A high dielectric constant type ceramic composition according to claim 1, characterized in that said composition comprises said basic ceramic composition and $Pb(Mn_{\frac{1}{3}}Nb_{\frac{2}{3}})O_3$ in an amount of from 0.05 to 5.0 parts by weight based on 100 weight parts of the basic ceramic composition.

6. A high dielectric constant type ceramic composition according to claim 5, characterized in that the amount of said $Pb(Mn_{\frac{1}{3}}Nb_{\frac{2}{3}})O_3$ is from 0.1 to 1.0 part by weight.

7. A high dielectric constant type ceramic composition according to claim 1, characterized in that said composition comprises said basic ceramic composition and $Pb(Mn_{\frac{1}{3}}Ta_{\frac{2}{3}})O_3$ in an amount of from 0.05 to 5.0 parts by weight based on 100 weight parts of the basic ceramic composition.

8. A high dielectric constant type ceramic composition according to claim 7, characterized in that the amount of said $Pb(Mn_{\frac{1}{3}}Ta_{\frac{2}{3}})O_3$ is from 0.5 to 3.0 parts by weight.

9. A high dielectric constant type ceramic composition according to claim 1, characterized in that said composition comprises said basic ceramic composition and $Pb(Mn_{\frac{1}{2}}W_{\frac{1}{2}})O_3$ in an amount of from 0.05 to 5.0 parts by weight, based on 100 weight parts of the basic ceramic composition.

10. A high dielectric constant type ceramic composition according to claim 9, characterized in that the amount of said $Pb(Mn_{\frac{1}{2}}W_{\frac{1}{2}})O_3$ is from 0.1 to 1.5 parts by weight.

11. A high dielectric constant type ceramic composition according to claim 1, characterized in that said composition comprises said basic ceramic composition and MnO in an amount of from 0.001 to 1.5 parts by weight, based on 100 weight parts of the basic ceramic composition.

12. A high dielectric constant type ceramic composition according to claim 11, characterized in that the amount of said MnO is from 0.005 to 0.2 parts by weight.

13. A high dielectric constant type ceramic composition according to claim 1, wherein said basic ceramic composition is mainly composed of a double oxide of $Pb(Mg_{\frac{1}{3}}Nb_{\frac{2}{3}})O_3$ and a double oxide of $PbTiO_3$, characterized in that said composition comprises an Mg oxide additive in addition to said double oxides and the amount of the Mg oxide additive is not more than 25 parts by weight, based on 100 parts by weight of an Mg oxide contained in the double oxide of $Pb(Mg_{\frac{1}{3}}Nb_{\frac{2}{3}})O_3$.

14. A high dielectric constant type ceramic composition according to claim 13, characterized in that the amount of said Mg oxide additive is from 3 to 9 parts by weight.

15. A high dielectric constant type ceramic composition according to claim 13, characterized in that said ceramic comprises $Pb(Mn_{\frac{1}{3}}Nb_{\frac{2}{3}})O_3$ in an amount of from 0.05 to 5.0 parts by weight based on 100 parts by weight of said double oxides.

16. A high dielectric constant type ceramic composition according to claim 1, wherein said basic composition is mainly composed of a double oxide of $Pb(Mg_{\frac{1}{3}}Nb_{\frac{2}{3}})O_3$ and a double oxide of $PbTiO_3$, characterized in that said composition comprises said basic ceramic composition and at least one additive element selected from the group consisting of barium, strontium and calcium in an amount of not more than 10 atomic parts, based on 100 atomic parts of lead contained in said double oxides.

17. A high dielectric constant type ceramic composition according to claim 16, characterized in that the amount of said at least one additive element is from 3 to 10 atomic parts.

18. A high dielectric constant type ceramic composition according to claim 1, wherein said basic ceramic composition is mainly composed of a double oxide of $Pb(Mg_{\frac{1}{3}}Nb_{\frac{2}{3}})O_3$ and a double oxide of $PbTiO_3$, and said double oxides are expressed by a form of $A_xB_yO_3$, characterized in that the molar ratio of A/B is from 0.9200 to less than 1.0000.

19. A high dielectric constant type ceramic composition according to claim 18, characterized in that said molar ratio of A/B is from 0.950 to 0.982.

20. A high dielectric constant type ceramic composition, characterized in that said composition consists essentially of from 60 to 98 molar% of $Pb(Mg_{\frac{1}{3}}Nb_{\frac{2}{3}})O_3$ and from 2 to 40 molar% of $PbTiO_3$, and further, from 0.2 to 8.0 parts by weight of at least one additive oxide selected from the group consisting of $Bi_2O_3$ and $WO_3$, based on 100 parts by weight of total weight of $Pb(Mg_{\frac{1}{3}}Nb_{\frac{2}{3}})O_3$ and $PbTiO_3$.

21. A high dielectric constant type ceramic composition according to claim 20, characterized in that the content of said at least one additive oxide is from 2 to 6 parts by weight.

* * * * *

UNITED STATES PATENT AND TRADEMARK OFFICE
CERTIFICATE OF CORRECTION

PATENT NO. : 4,265,668
DATED : May 5, 1981
INVENTOR(S) : Shinobu Fujiwara, et al It is certified that error appears in the above—identified patent and that said Letters Patent is hereby corrected as shown below:

Correct Foreign Application Priority Data from "54/24246" to --54/26446--.

Col. 2, line 9, correct spelling of "capacitor".

Col. 4, line 60, change "(R)" to --(IR)--.

Col. 5, line 17, change "to" to --too--.

Col. 5, line 33, change "the", second occurrence, to --to--.

Col. 5, line 39, change "tha" to --than--.

Col. 5, line 60, change "(tan $\varepsilon$)" to --(tan $\delta$)--.

Col. 6, line 29, change "(tan $\varepsilon$)" to --(tan $\delta$)--.

Table 7, under heading "PbO" change "63.67" to --68.67--.

Col. 17, line 38, change "part" to --parts--.

Col. 17, line 63, change "n" to --in--.

Table 8, under heading "Sample No." change "126" to --126*--.

UNITED STATES PATENT AND TRADEMARK OFFICE
CERTIFICATE OF CORRECTION

PATENT NO. : 4,265,668
DATED : May 5, 1981
INVENTOR(S) : Shinobu Fujiwara, et al It is certified that error appears in the above—identified patent and that said Letters Patent is hereby corrected as shown below:

Col. 2, line 33, change "$TbTiO_3$" to --$PbTiO_3$--.

Table 9, under heading "Sample No." change "145" to --145*--.

Table 8, under heading "$\varepsilon_s$" change "2.200" to --22000--.

Signed and Sealed this

Fifteenth Day of September 1981

[SEAL]

Attest:

Attesting Officer

GERALD J. MOSSINGHOFF
Commissioner of Patents and Trademarks